(12) United States Patent
Moir

(10) Patent No.: US 7,200,854 B2
(45) Date of Patent: Apr. 3, 2007

(54) TELEVISION PROGRAM LENGTH INDICATOR

(75) Inventor: Mark Moir, Waterbeach (GB)

(73) Assignee: Pace Micro Technology Plc, Saltaire, Shipley (GB)

( * ) Notice: Subject to any disclaimer, the term of this patent is extended or adjusted under 35 U.S.C. 154(b) by 744 days.

(21) Appl. No.: 09/761,139

(22) Filed: Jan. 16, 2001

(65) Prior Publication Data

US 2001/0010094 A1 Jul. 26, 2001

(30) Foreign Application Priority Data

Jan. 22, 2000 (GB) .................... 0001424.1

(51) Int. Cl.
G06F 3/00 (2006.01)
G06F 13/00 (2006.01)
H04N 5/445 (2006.01)

(52) U.S. Cl. .......................... 725/40; 725/43

(58) Field of Classification Search ............ 725/40–44, 725/47, 52

See application file for complete search history.

(56) References Cited

U.S. PATENT DOCUMENTS

| 5,353,121 | A | 10/1994 | Young et al. | |
|---|---|---|---|---|
| 5,585,838 | A * | 12/1996 | Lawler et al. | 725/54 |
| 5,635,978 | A | 6/1997 | Alten et al. | |
| 5,654,748 | A * | 8/1997 | Matthews, III | 725/14 |
| 5,751,372 | A | 5/1998 | Forson | |
| 6,462,784 | B1 * | 10/2002 | Kohno et al. | 348/563 |
| 6,522,342 | B1 * | 2/2003 | Gagnon et al. | 345/716 |
| 6,601,238 | B2 * | 7/2003 | Morrison et al. | 725/50 |

FOREIGN PATENT DOCUMENTS

| EP | 0802673 A | 10/1997 |
|---|---|---|
| GB | 2326788 A | 12/1997 |
| WO | WO98/07277 | 2/1998 |
| WO | WO99/48287 | 9/1999 |

OTHER PUBLICATIONS

RD 385007 A May 1996.*

* cited by examiner

*Primary Examiner*—Scott Beliveau
(74) *Attorney, Agent, or Firm*—Head, Johnson & Kachigian

(57) ABSTRACT

The invention relates to a television or electronic program guide (EPG) of the type which is displayed on the screen of a television set to indicate channels, and programs, which are available for viewing over a time period indicated by a time bar (4). In accordance with the invention the length of the program is indicated by a cell in a displayed grid (2) and, if the program has started or will finish prior to or after the time period displayed, a display is generated which indicates to the viewer the time which has lapsed since the program started or the time remaining of the program.

3 Claims, 1 Drawing Sheet

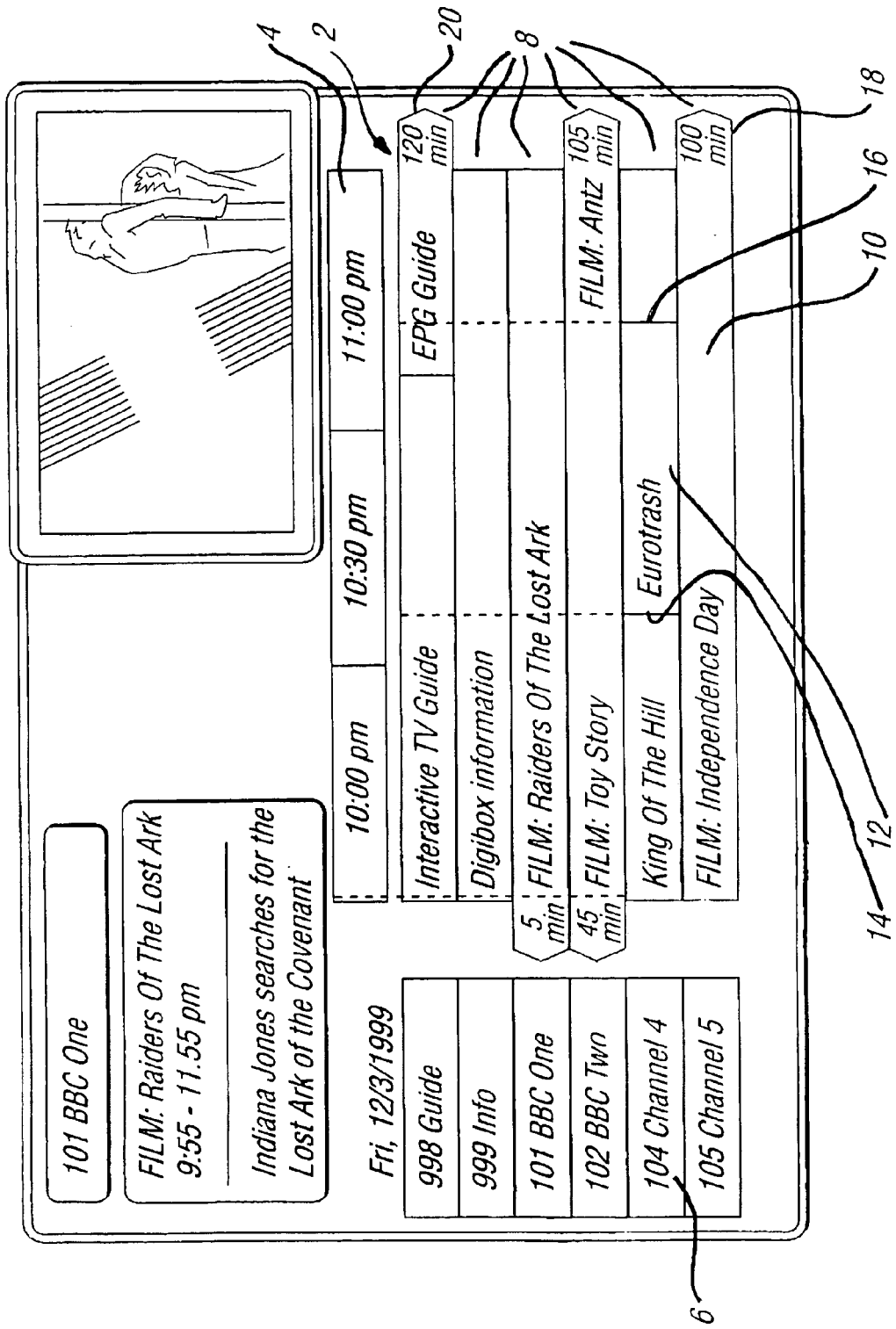

TELEVISION PROGRAM LENGTH INDICATOR

CROSS-REFERENCE TO RELATED APPLICATIONS

This application claims priority to GB Application No. 0001424.1 filed 22 Jan. 2000.

The invention to which this application relates is a television program guide of the type which is generated on a display screen such as that of a television set. The program guide is generated from data which is broadcast from a remote location such as by a television service provider or even an independent television guide provider. The data is broadcast to a number of locations via satellite, cable and/or terrestrial systems and, connected to the display screen is a receiver for said data, typically transmitted in a digital form. The receiver allows for the decoding and subsequent processing of the received data and, the process data is used to generate said television program guide on screen for use and reference by the user of the apparatus. The user can select certain channels and/or programs from the screen by moving a cursor around the television program guide using an appropriate control device such as a remote control.

Television program guides have become increasingly complicated due to the large number of channels and programs which are available at any one time due to the provision of digital data broadcast systems. The conventional manner of placing television schedules in newspapers and/or magazines still exists but is increasingly impractical due to the wide number of television programs which can be selected by the user and it therefore becomes increasingly difficult for the user to make sense and view the entire range of programs which are available for selection at any one time.

This has led to the generation of television program guides which can consist of a number of user selectable display "pages". The pages can be selected in terms of the display of all channels which are available, the display of channels which show material relating to particular selected subject matter such as movies, sport etc, it may show pre-selected channels which are indicated by the user and so on. There are also typically two formats of display, one being a display which shows relatively detailed information relating to user selected programs and another which shows, typically only titles, of a range of programs available on a range of channels over a particular period of time. The purpose of this format is to allow the user to see as wide a range of available channels as possible on one display page.

One known format to do this is to provide a grid form and along a horizontal axis there is defined a particular time period, say 1½–2 hours and along a vertical axis there is defined a number of channels. Each channel has a row which passes along the length of the time bar and each row can be split into a number of cells. Each cell represents a particular program and the length of each cell with respect to the time bar, can indicate firstly the length of the program and secondly the start and finish times of each program, which are indicated by the start and finish of each cell with reference to the time bar.

It will be appreciated that as the time bar progresses and is updated depending on the time of viewing by the user, not all programs will start and/or finish within the particular time period displayed on screen. Conventionally, if a particular program cell does not start or finish on the display page shown, an arrow icon is generated at the start or end of the particular cell or program in question and this is used as an indictor to the user that firstly, the particular program has started previously or does not finish until a later time than that displayed and, secondly if a user wishes to identify the start or finish time they are required to scroll up or down to see the previous or future display page which can take time and is inconvenient to the user. Thus, at present, while there is known the generation of an indicator to indicate that a particular program has not started or finished within the time period shown on a display page, the user cannot tell from a display page the time which has elapsed or will elapse before the start or finish of the programs respectively.

SUMMARY OF THE INVENTION

The aim of the present invention is to allow further information to be provided to a user when viewing a display page of a television program guide.

In a first aspect of the invention there is provided a television program guide display providing information relating to programs which can be selected to be viewed said display including a grid having a time bar to indicate the particular time period to which the display relates, a series of cells, each cell representing a program, and one or a number of the cells representing a program channel, at least one of said cells selectable to select a program for viewing and characterised in that if a program indicated by a cell does not start or finish within the time period represented by the time bar on the display, a display portion is generated on the display with respect to the said cell for the program at an appropriate location and said display portion shows the time which has elapsed since the said program started and/or which will lapse beyond the time period shown before the program ends.

Preferably for any particular time period a plurality of cells, each corresponding to a program show the time which has elapsed since each program started and/or will lapse beyond the time period shown before the program ends. Thus the user can see at a glance a list of programs being shown at a particular time and how much time has elapsed since the start of each program.

In one embodiment the time displayed is calculated from the start and end times for the time period shown as appropriate. In an alternative embodiment the time displayed is calculated with respect to the time at which the display is being viewed by the user.

Thus, using the application in accordance with the invention, the user can find out, for example, whether a program has only recently started with respect to the time in which they are viewing the television program guide and therefore may be worth watching or, whether the program indicated by the cell has been started for a considerable period of time and therefore would not be worth watching further. Equally, the user can find out how long a particular program is to last, all from one display page rather than the previous conventional need to scroll through further display pages to find the said further information. Thus there are considerable savings to the user in terms of time of use of the program guide and improvements to the utility of said display page to the user.

In a further aspect of the invention there is provided a method of generating a television program guide, said television program guide including at least one display page comprising a grid, generating said grid by providing a time bar, a series of cells, each cell indicating a program to be shown on a particular channel over the time period displayed, and the size of each cell, indicating the start, finish and length of each program with respect to the time bar and characterised in that, if a cell for a particular program indicates that the said program has already started prior to the time period displayed on the display page or finishes after the time period displayed on the display page, a calculation is undertaken between the start or finish times of the time bar which is displayed and the start or finish times of the particular program as appropriate and the difference is displayed with respect to the said program cell on the display.

In a yet further aspect of the invention there is provided a method of generating a television program guide, said television program guide including at least one display page comprising a grid, generating said grid by providing a time bar, a series of rows of cells, each row indicating a particular channel and the programs to be shown on that channel over the time period displayed, generating in each row, one or a plurality of cells, each cell indicating a program and the size of each cell, indicating the start, finish and length of each program with respect to the time bar and characterised in that, if a cell for a particular program indicates that the said program has already started prior to the time period displayed on the display page or finishes after the time period displayed on the display page, a calculation is undertaken between the start or finish times of the time bar which is displayed and the start or finish times of the particular program as appropriate and the difference is displayed with respect to the said program cell on the display.

It is envisaged that the said time can be displayed as an additional portion of the cell so that those cells which indicate programs which have started or will finish outside the time period which is displayed on the display page, will protrude from the appropriate side edge of the grid and, in said additional portion, will be displayed the time which has elapsed or will lapse from the start or before the finish of the program as appropriate.

In one embodiment, the calculation and data relating to the calculation will be transmitted from the broadcaster at the remote location so that, during the processing of the data, the receiver will be required to process the data and generate the display page which can include said time indications.

DESCRIPTION OF THE DRAWINGS

Referring now to FIG. 1, there is illustrated one format of display page in accordance with the invention.

DESCRIPTION OF THE PREFERRED EMBODIMENT

In this FIGURE, there is shown a display page which can be generated in response to user selections, and is a display page of one form of television program guide.

The guide includes a grid 2 which is generated with respect to a time bar 4 to indicate the time period for which the display is generated and a channel column 6 which indicates those channels for which the grid has been generated. Each channel in the column is allocated a row 8 and the row can comprise one or a plurality of cells 10. Each cell represents a television program which is to be shown on that channel during the time period represented by a time bar and can, as shown, include a title of the program.

For those programs which start and finish within the time period represented by the time bar, they will be generated in the manner shown, for example at cell 12. The start of the program is indicated by the start the cell with reference to the time bar as illustrated by the line 14 and the end of the program is represented by the end of the cell with respect to the time bar as indicated by the line 16.

However, in some instances, the program represented by the cell has either started before the time period displayed or will finish after the time period displayed. In these circumstances, the invention allows for the indication of the time which has elapsed or the time which will elapse from the start or before the finish respectively and this has not previously been done in conventional television program guides where conventionally, the user has to select further display pages for the further information which is time consuming.

In accordance with the invention, if in the processing and generation of the television program guide display page as shown, the receiver or broadcaster identifies that a particular cell which is to be generated will not start and/or finish on the time period displayed, a calculation takes place between the actual time at which the display page is being viewed or alternatively, the start or end times of the time bar which is being displayed and the start or end time of the program for which the cell is generated. The time is then displayed in an additional portion 18 which is annexed as shown, to the appropriate cell so that it provides a visual indication to the user that firstly the television program represented by that cell has already started at an earlier time than that displayed by the time bar on the display page or will finish at a later time than that displayed on the time bar on the display page and furthermore, the time which has elapsed or will lapse from the start or before the finish. This is an important indication to the user as, if for example, a program lasts an hour and only 5 minutes has elapsed since it started, the user can select that it would still be worthwhile and of interest to them to start watching that program. If however the program lasts an hour and it is shown to the user that it has already been on for 55 minutes, then the user will not investigate further and decide not to watch the program. Equally, if the user has say a period of time of 1 hour in which to watch television programs before they leave the premises, and a particular program say that represented by cell 20, is indicated as not finishing for another period of time well over an hour, then the user can disregard that as they will not be able to watch the end of it in any case.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A method of generating a television program guide, said television guide including at least one display page comprising a grid including the following steps:

generating said grid by providing a time bar, a series of cells, each cell indicating a program to be shown on a particular channel over the time period displayed, and the size of each cell indicating the start, finish and length of each program with respect to the time bar;

calculating for each of the cells difference between the start time of the time bar and the start time of the program when at least one or more programs indicated by one or more corresponding cells within the grid starts outside the time period displayed;

calculating for each of the cells difference between the end time of the time bar and the finish time of the program when at least one or more programs indicated by one or more corresponding cells within the grid finishes outside the time period displayed; and generating a display portion displaying the difference with respect to the program cell on the display for each of the programs which start or finish outside the time period displayed, wherein the display portion is generated simultaneously for two or more cells within the grid.

2. A method of generating a television guide display according to claim 1 wherein the display portion is provided as an additional portion of the cell so that those cells which indicate programs which have started or will finish outside the time period which is displayed on the display page, will protrude from the appropriate side edge of the grid and, in said additional portion, will be displayed the time which has elapsed or will lapse from the start or before the finish of the program as appropriate.

3. A method according to claim 1 including the step of transmitting the calculation, and data relating to the calculation, from a broadcaster at a remote location to a broadcast data receiver so that, during the processing of the data, the broadcast data receiver can generate the display page to include said display portions.

* * * * *